United States Patent [19]
Honkasalo et al.

[11] Patent Number: 6,094,426
[45] Date of Patent: Jul. 25, 2000

[54] METHOD FOR SCHEDULING PACKET DATA TRANSMISSION

[75] Inventors: Zhi-Chun Honkasalo, Bedford, Tex.; Pasi Liimatainen, Ruutana, Finland; Sona Kapadia, San Diego; John Noneman, Valley Center, both of Calif.

[73] Assignee: Nokia Mobile Phones Limited, Espoo, Finland

[21] Appl. No.: 09/255,251

[22] Filed: Feb. 22, 1999

Related U.S. Application Data

[62] Division of application No. 08/851,368, May 5, 1997.

[51] Int. Cl.$^7$ .................. H04Q 7/00; H04J 3/24
[52] U.S. Cl. .................. 370/331; 370/329; 370/349
[58] Field of Search .................. 370/329, 331, 370/330, 335, 338, 349, 348, 445, 465; 455/450, 452, 524, 560, 561

[56] References Cited

U.S. PATENT DOCUMENTS

| | | | |
|---|---|---|---|
| 5,257,257 | 10/1993 | Chen et al. | 370/18 |
| 5,373,503 | 12/1994 | Chen | 375/200 |
| 5,436,905 | 7/1995 | Li et al. | 370/346 |
| 5,519,706 | 5/1996 | Bantz et al. | 370/329 |
| 5,537,414 | 7/1996 | Takiyasu et al. | 370/347 |
| 5,640,395 | 6/1997 | Hamalainen et al. | 370/322 |
| 5,644,576 | 7/1997 | Bauchot et al. | 375/202 |
| 5,666,348 | 9/1997 | Thornberg et al. | 370/322 |
| 5,684,791 | 11/1997 | Raychaudhuri et al. | 370/349 |
| 5,742,588 | 4/1998 | Thornberg et al. | 370/329 |
| 5,787,080 | 7/1998 | Hulyaikar et al. | 370/348 |
| 5,828,662 | 10/1998 | Jalali et al. | 370/335 |

FOREIGN PATENT DOCUMENTS

| | | |
|---|---|---|
| 2 270 815 | 3/1994 | United Kingdom . |
| WO 94/10767 | 5/1994 | WIPO . |

OTHER PUBLICATIONS

DeVile, J.M., A Reservation Based Multiple Access Scheme For a Future Universal Mobile Telecommunications System:, IEE, Dec. 15, 1993, Conference Publication No. 387 pp. 210–215.

Ziegler, Robert A., "An Experimental Implementation of the PRMA Protocol for Wireless Communication", 43$^{rd}$ IEEE, Vehicular Technology Conference, 1993, pp. 909–912.

*Primary Examiner*—Min Jung
*Assistant Examiner*—Chiho Andrew Lee
*Attorney, Agent, or Firm*—Harry F. Smith; Brian T. Rivers

[57] ABSTRACT

In a packet data transmission and reception system a media access control (MAC) message is broadcast by a base station to a plurality of mobile stations. The MAC message contains packet data transmission scheduling information which allows the base station to preemptively control mobile station access to traffic channels in order to maximize the efficiency of packet data transmissions and allow scheduling consideration including priority access, quality of service and maximum bytes per transfer. The MAC message consists of a control frame structure which comprises scheduling parameters including MAC IDs fields, activity fields, and a field representing the number of free traffic channels in a cell. These parameters enable multiple mobile stations to share, in a time multiplexed fashion, traffic channels for packet data transmission on CDMA based mobile communication systems.

2 Claims, 7 Drawing Sheets

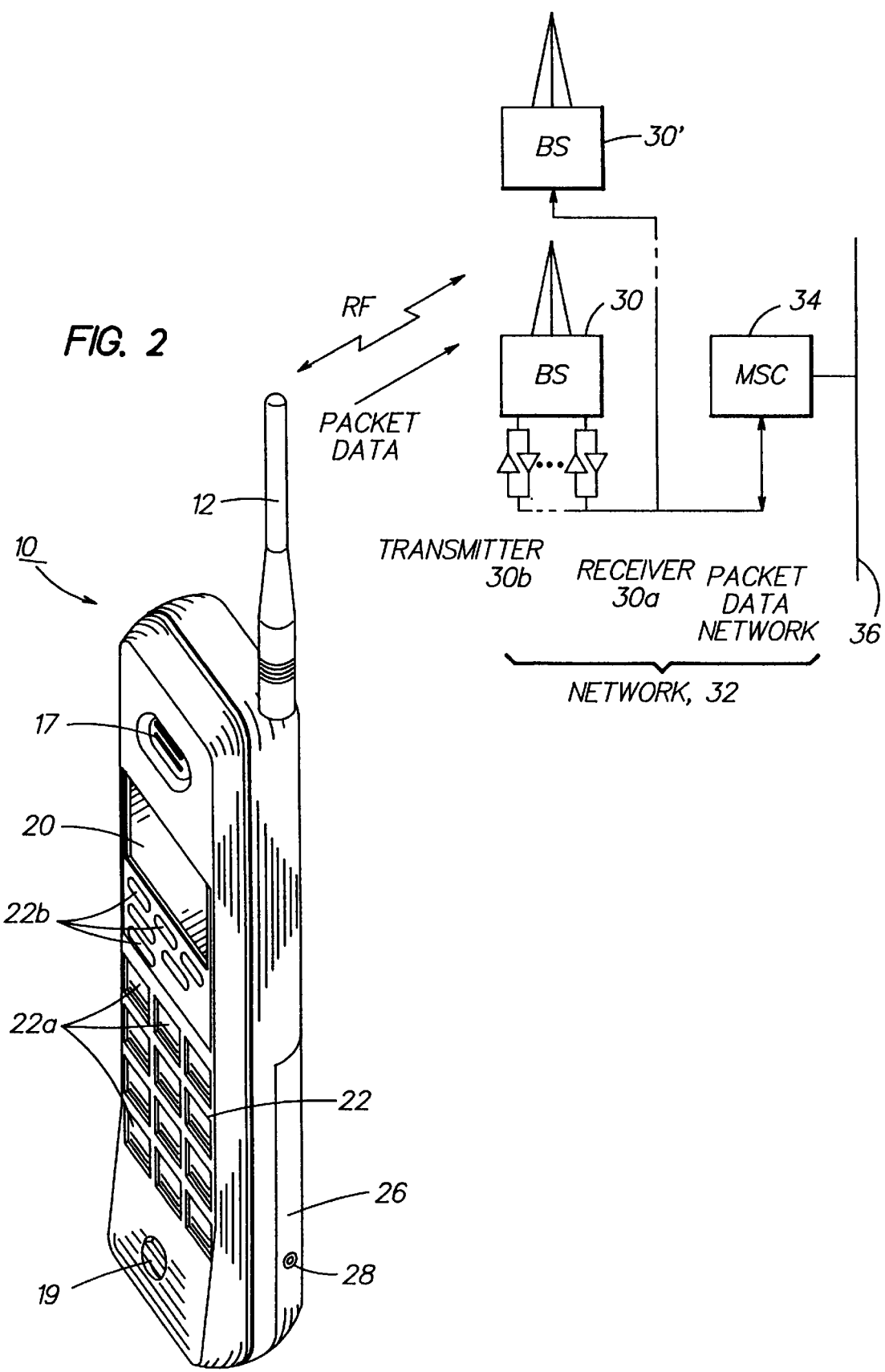

METHOD FOR SCHEDULING PACKET DATA TRANSMISSION

This application is a divisional of Ser. No. 08/851,368, May 5, 1997.

BACKGROUND OF THE INVENTION

1. Field of the Invention

This invention relates to cellular telephone network data transmission, specifically to a method of scheduling packet data transmission for a connection-less packet service.

2. Prior Art

Packet data communication is known in cellular telephone systems, as is evidenced by, for example, commonly assigned U.S. Pat. No. 5,257,257, issued Oct. 26, 1993, entitled "Method of Controlling the Operation of a Packet Switched CDMA Communication Network for Controlling the Operation of Transmitters and Receivers", by X. H. Chen and J. Oksman.

One further example is defined in TIA/EIA/IS-657, Packet Data Service Option for Wideband Spread Spectrum Cellular System. IS-657 is used along with TIA/EIA/IS-95A, Mobile Station-Base Station Compatibility Standard for Dual-Mode Wideband Spread Spectrum Cellular System, and, TIA/EIA/IS- 99 Data Services Option Standard for Wideband Spread Spectrum Digital Cellular System. The current IS-657 based packet data scheme for code division multiple access (CDMA) does not allow the traffic channel to be shared between more than one user. The IS-657 scheme is based on a make-and-break of multiple traffic channel connections during the life of a packet data session. In the worst case, a packet may suffer a call set-up delay which can range from tens of milliseconds to a few seconds. Also, it is possible for a mobile station (MS) to transmit idle (eighth rate) frames for a user defined time if there are no packets to send. This results in wasted bandwidth, especially in high-speed data systems, because the traffic channel capacity is reserved for this user and cannot be utilized by any other user. Thus, an access scheme that allows two or more users to share traffic channels, and allows the network to control the packet delay is needed.

In connection-less packet data transmission in mobile communication systems, discrete packets are transmitted on a packet-basis, that is, no dedicated end-to-end connection is set up. Sharing of traffic channels in connection-less packet data transmission has generally been supported via random access or random reservation media access control (MAC) protocols. Under these MAC protocols, multiple mobile stations compete for traffic channels in order to receive packet data service from a base station (BS). The number of available traffic channels for packet service within a cell is defined by the BS.

Random reservation protocols are generally believed to offer high channel utilization. However, in a CDMA based system that is approaching the system's maximum capacity, random access attempts are more likely to be unsuccessful due to higher interference levels. Thus, as a cell approaches its maximum capacity of available traffic channels, multiple MSs compete for fewer and fewer available traffic channels. This normally leads to even further access attempts by the MSs. Often, the random attempts themselves increase the communications load in the cell and reduce traffic channel capacity.

OBJECTS AND ADVANTAGES OF THE INVENTION

It is a first object and advantage of this invention to provide an efficient method for transmitting packet data over a cellular communication network that overcomes the foregoing and other problems.

Another object and advantage of this invention is to maintain scheduled traffic channel sharing among multiple packet data users who are attached to a cell of a mobile communication network.

Another object and advantage of this invention is to provide the base station of a cellular communication network with control over which mobile station(s) may attempt access to the system during a specified period of time.

Another object and advantage of this invention is to provide the base station of a cellular communication network the ability to preemptively control priority and duration of mobile station access by employing a scheduling method which considers one or more parameters including priority access service, quality of service, and a maximum number of bytes per transmission.

SUMMARY OF THE INVENTION

The foregoing and other problems are overcome and the objects of the invention are realized by methods and apparatus in accordance with embodiments of this invention. More particularly, this invention is directed to solving the problem of inefficient packet data transmission in CDMA based mobile communication systems.

Scheduled packet access, as taught by this invention, leads to more stable load conditions, offers higher channel utilization, and enables determination and control of a maximum delay in packet data transmission experienced by users. According to the teachings of this invention, the BS divides access to the traffic channel(s) allocated for packet data services into time slots. The right to access a given traffic channel for a specific time slot is referred to as a packet token, hereinafter simply a token. One or more token(s) are allocated to the MSs from time slot to time slot, in a pre-defined manner. The token allocation schedule is determined at the BS, which may employ a variety of schemes to determine how the token is assigned. This pre-defined, scheduled token allocation is distinguishable over conventional random access and random reservation protocols. Token allocation, as taught by this invention, is accomplished by granting transmission access to an available traffic channel to each packet data MS in the cell according to specific, scheduled time intervals. This scheduled approach allows the BS to preemptively control traffic channel access among packet data MSs. Random access protocols, on the other hand, allow access to an available traffic channel as a packet data MS requests it. Thus, the conventional random protocols employ a first-come-first-serve method of traffic channel access assignment.

Allocating the right to access an available traffic channel may not always result in a transmission from the packet data MS. If, at the end of a time slot, the BS has not received a valid transmission from the MS(s) who are allocated the token(s), either because the MS has nothing to send or an access preamble did not reach the BS successfully, then the BS allocates the token to the next MS(s) in the cell. In this way, the MSs share the packet traffic channels in a time-multiplexed fashion, and the BS schedules and controls the allocation of the traffic channels at all times. This technique eliminates the problems associated with conventional MS random access attempts to gain a traffic channel for transmitting a packet.

This invention preferably employs a technique in which a BS transmits at least one dedicated MAC channel on the forward link. When transmitting the MAC channel messages to a specific MS the BS may use a permuted electronic serial number (ESN) of the MS as a long code mask, and when broadcasting MAC channel messages to all MSs within a cell the BS preferably uses a public long code mask. The MAC channel messages convey packet data traffic channel information and status information on the allocation of the token(s) to packet mobile stations in the cell. The MAC channel messages are updated to reflect the latest token usage. By decoding the latest MAC channel message a MS evaluates who has the token(s) for the next time slot, and is able to predict when it should next be allocated the token from the BS. The MS holding a token may attempt to access the traffic channel if it has data to send. The MS preferably uses its own private long code for reverse link transmission, as the BS expects a preamble signal from the MS(s) currently holding a token. Every packet traffic channel has a pre-defined Walsh code associated on the forward link to which the MS listens to determine whether its access was successful. After an access acknowledgement is received from the BS, the MS terminates the preamble and starts to transmit its packet data. At this point, the MS may negotiate the traffic channel data rate with the BS. The initial traffic channel data rate is pre-defined by a Service Option and may be as low as a predefined low speed data service, such as 9.6 kpbs.

Once occupied, the traffic channel is preferably allocated to that MS until the end of the packet. The maximum time a MS is allowed to occupy a channel is predefined by the network, so that the BS can predict worst case channel usage. The BS may employ various techniques to ensure efficient channel usage. For example, when assigning a token, the BS may define a maximum number of bytes that a MS may transmit. If this maximum number of bytes per transmission is exceeded, the BS has the option to terminate a packet transmission by sending a transmission stop bit on the associated forward link traffic channel. If the transmission is stopped, the MS relinquishes the token at the next time slot and rejoins the pool of MSs awaiting the next available token. Similarly, if the transmission of packet data completes the MS yields the token at the next time slot. These techniques for monitoring transmissions may be based on equal sharing between MSs, or allow for different priorities of transmission which depend on the quality of service selected.

In accordance with the present invention, the BS allows the MS to turn off its receiver and save power during the periods when the MS does not hold the token. If the MS does shut down its processing between tokens the BS informs the MS, before the MS shuts down, when it should start its processing again, i.e. when the MS will be allocated the token again. This notification by the BS before the MS shuts down is possible as the token is assigned in advance. Thus, a "dynamic slotted mode" operation is provided, the operation being dynamic in that the position of the slot need not be the same in every cycle. The slot position is a function of how many active MSs are on the channel, and on how much data each MS can transmit. Additionally, the number of slots is a function of the number of available channels at the BS.

The BS may transmit packets destined for a MS, if any, or fill data, on the forward link at the same time that the MS is allocated a token and is transmitting packets on the reverse link. This allows the BS to send power control information to the MS.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 depicts the terminal of FIG. 1 in communication with a CDMA cellular network;

DETAILED DESCRIPTION OF THE INVENTION

Figure 1:
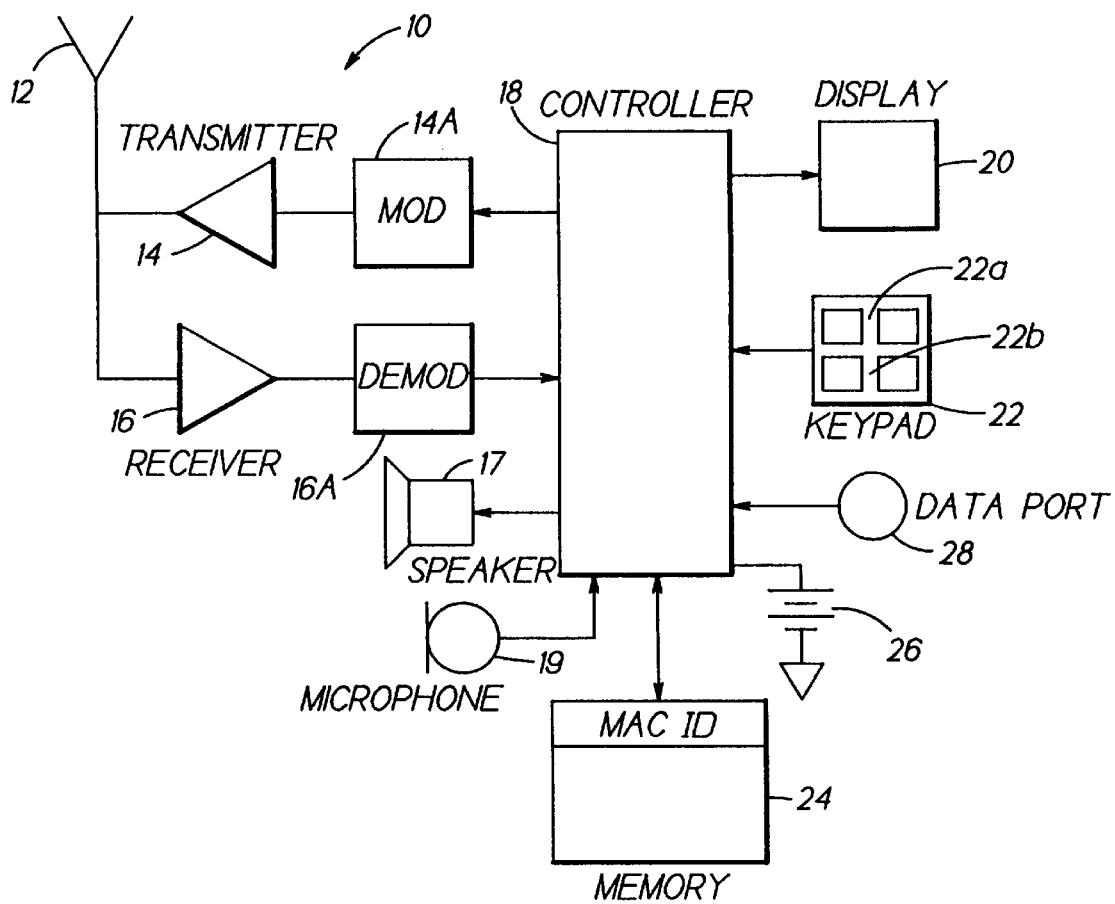
FIG. 1 is a block diagram of a cellular terminal that is suitable for practicing this invention.

Reference is first made to FIGS. 1 and 2 for illustrating a wireless user terminal or mobile station (MS) 10, such as but not limited to a cellular radiotelephone or a personal communicator, that is suitable for practicing this invention. The MS 10 includes an antenna 12 for transmitting signals to and for receiving signals from a base site or base station (BS) 30. The BS 30 is a part of a cellular network 32 that includes a mobile switching center (MSC) 34, and a plurality of additional BSs, such as BS 30'. Each BS, for example BS 30, services an associated cell within the network 32 and is assumed to include a plurality of receivers 30a and transmitters 30b, some of which can be allocated for packet data services. The MSC 34 provides a connection to landline trunks when the mobile station 10 is involved in a call. It is assumed for the purposes of this invention that the network 32 supports packet data service. For example, the network 32 may be coupled to a packet data network 36 such as the internet, and/or to a LAN or WAN.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a capability to convey packet data.

In the presently preferred embodiment of this invention the modulator 14A, transmitter 14, receiver 16, and demodulator 16A are adapted to operate with a code division multiple access (CDMA) system, such as one specified in IS-95A. The teaching of this invention is not, however, limited for use with only this type of system, but may be employed with a number of different types of systems having different modulation and access characteristics, such as time division, multiple access (TDMA) systems.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

The mobile station 10 may be capable of voice transmissions also, and thus can include a user interface comprised of a conventional earphone or speaker 17, a conventional microphone 19, a display 20, and a user input device, typically a keypad 22, all of which are coupled to the controller 18. The keypad 22 includes the Conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 may also include a battery 26 for powering the various circuits that are required to operate the mobile station.

It should be realized that in other embodiments the mobile station 10 may function only as a data terminal for at least one of transmitting or receiving packet data. The mobile station 10 which functions as a data terminal can include a data port 28 which is coupled to the controller 18. As a data terminal, certain of the user interface components described above may not be included. It should also be appreciated that in some embodiments the mobile station 10 may not be mobile at all, but may be operated at a fixed location (for example, as a component of a wireless facsimile machine in an office environment).

The mobile station 10 also includes various memories, shown collectively as the memory 24, wherein are stored a plurality of constants and variables that are used by the controller 18 during the operation of the mobile station. For example, the memory 24 may store the values of various cellular system parameters and the number assignment module (NAM). An operating program for controlling the operation of controller 18 is also stored in the memory 24 (typically in a ROM device). The memory 24 may also store packet data prior to transmission or after reception. The memory 24 includes routines for implementing the methods described below in relation to FIGS. 4, 5 and 6.

Packet data service options provide a mechanism of establishing and maintaining traffic channels for packet data service. A packet data service option is negotiated during call origination or at a later time during a call. The details of establishing packet data service can be found in, by example, IS-95A, IS-657, and IS-99.

Figure 3A:
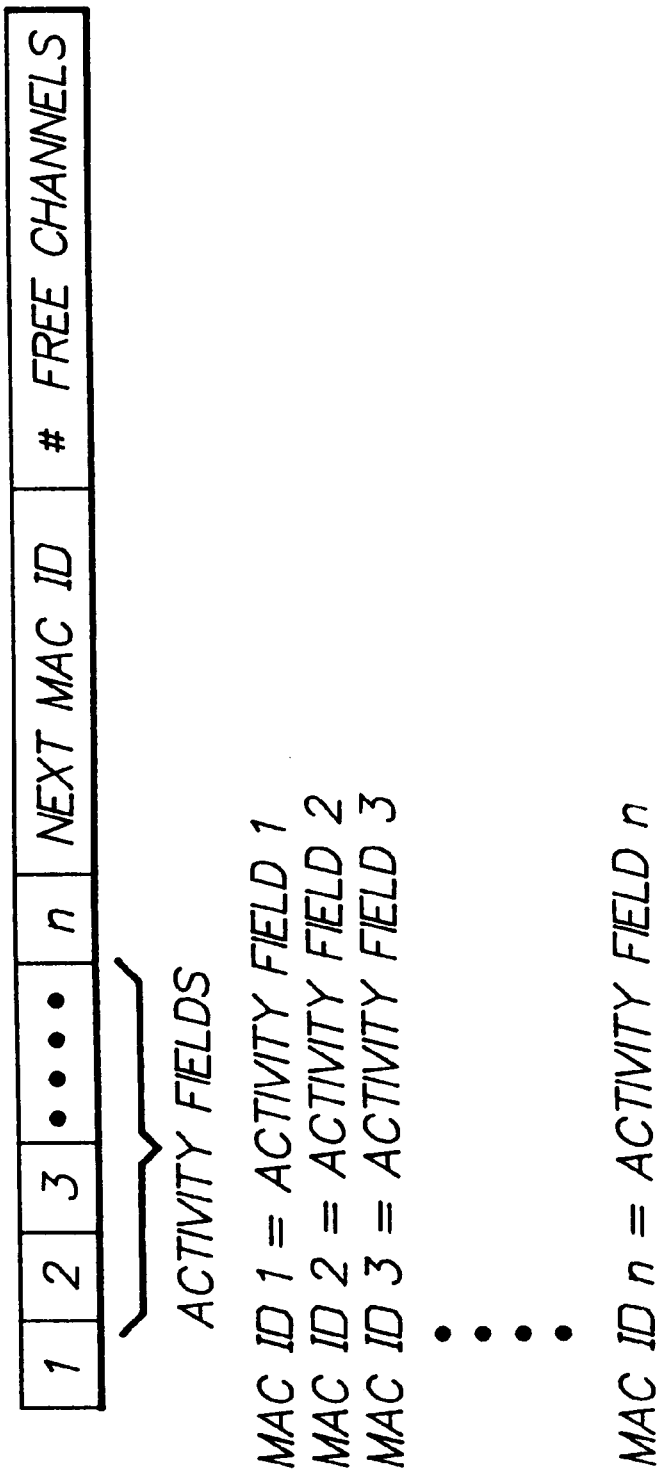
FIG. 3A is a pictorial representation of a media access control (MAC) channel frame structure employed, in accordance with the invention, by the BS to broadcast packet data traffic channel information and token allocation information to each MS.
Figure 3B:
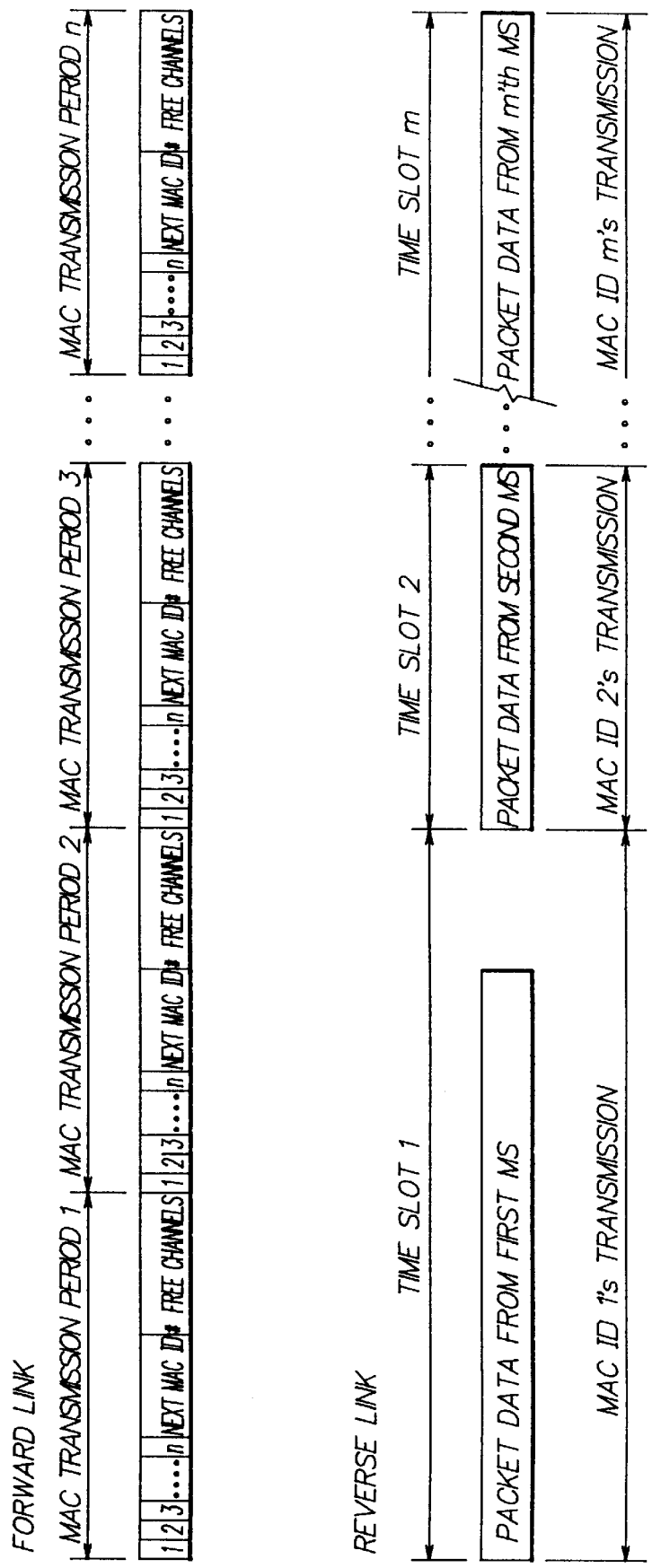
FIG. 3B is a pictorial representation of the Forward Link BS MAC Transmissions in relation to the Reverse Link MS Transmission Time Slots.

In accordance with this invention, the call origination messages are modified from the definitions in the above mentioned standards to include a MAC channel frame structure as shown in FIG. 3A. The MAC channel frame structure is broadcast by the BS 30 to all MSs 10 within the cell at regular intervals of time, referred to as a MAC transmission period. The BS 30 divides access to the traffic channel(s) allocated for packet data services according to time slots. A time slot is defined as the time period required for a MS to transmit all or some of its packet data. A time slot is limited to the maximum transmission time set by the BS 30. Time slots may be of unequal duration, as each time slot's duration can be defined by the amount of packet data a MS 10 is transmitting, up to a maximum transmission time. Additionally, one or more MAC transmission periods may elapse within a time slot, however, each time slot has a duration that is a whole multiple of the duration of the MAC transmission period. The relationship between time slots and MAC transmission periods is illustrated in FIG. 3B. In essence, the time slot represents a given period of time in which a MS 10 has the right to access a traffic channel. The MS 10 that is allocated this access right is allocated a token.

The MAC channel frame structure contains various fields that are used by the BS 30 to schedule traffic channel access, i.e. token allocation. As is shown in FIG. 3B, a portion of an assigned time slot may be unused by a MS 10.

The MAC channel frame structure includes a plurality of one bit wide fields, 1 to n. These fields are referred to as "activity" fields. Each activity field defines the status of a corresponding MS 10, and may have a value of either zero ("0") or one ("1"). A field value of zero indicates that the corresponding MS 10 has not been assigned to a traffic channel by the BS 30. A field value of one indicates that either the MS has been assigned to receiver hardware in the BS 30, or that the activity field is not currently assigned to any MS within the cell. In the preferred embodiment, the activity field is a one bit wide field, however, a field width of more than one bit may be used for conveying the activity status information of one or more MSs 10.

Additionally, each activity field corresponds to a temporary identification number that is assigned by the BS 30 to the MSs 10 for purposes of media access control. These temporary identification numbers are referred to as MAC IDs. The BS 30 allocates a different MAC ID, and hence a different corresponding activity field, to each MS 10 within the cell. A MAC ID is valid for the BS 30 that assigns it, and multiple BSs 30 may each assign different MAC IDs to the MS 10 in order to support virtual "soft handoff". Thus, each packet may be routed via a different BS 30, but never via more than one BS for one packet, depending on the signal condition to/from that BS. The virtual soft handoff is preferably mobile-assisted and is based on the pilot signal condition seen by the MS 10, in the similar manner as in conventional soft handoff procedures.

According to the embodiments of this invention, the virtual soft handoff procedure differs from conventional soft handoff procedures. In conventional soft handoff procedures, the traffic channel is handoff from a first BS to a second BS. In accordance with this invention, the mobile station's monitoring of the MAC channel is handoff from the MAC channel of the first BS 30 to the independent MAC channel of the second BS 30'. In other words, the MS 10 is first receiving MAC information from the MAC channel of the first BS 30. At some point, the MS 10 will be receiving the MAC channel of the first BS 30 as well as the MAC channel of the second BS 30'. Because token allocation and scheduling information is maintained within the MAC information the MS may receive a token from either BS 30 or 30' and transmit to that BS during the virtual soft handoff process. Once a token is received it is held until transmission is completed. For example, a token received from the first BS 30 does not give the MS 10 the right to transmit to the second BS 30'. Additionally, there may be an occurrence when a token is simultaneously offered by both BSs, 30 and 30', servicing the MS 10. In this event, the MS 10 preferably accepts the token that is allocated by the "best" quality channel (e.g. lowest bit error rate or frame error rate) and transmits the packet data to the associated BS 30 or 30'. When the pilot signal of the first BS 30 drops below a predetermined level the MS 10 drops the MAC channel of the first BS 30 and monitors only the MAC channel of the second BS 30'. After the MS 10 drops the first BS 30, the first BS 30 is free to reassign the MAC ID it previously assigned to the MS 10.

Because every packet MS 10 has its own MAC ID the total number of required MAC IDs could become excessively large for a large cell. Therefore, packet users may be divided into MAC sub-groups, and MAC ID numbers can be re-used within the sub-groups of different channels.

MAC IDs are preferably allocated by the BSs 30 during a "virtual call set-up" procedure. The BS 30 that performs the virtual connection is preferably the BS from which the MS 10 receives the strongest pilot signal. This invention assumes that the interworking function (IWF) that has been established with a fixed packet data network, e.g. internet, resides in the mobile network, not at the first BS where the MS sets up the virtual connection. That is, the IWF in the MSC 34 is connected to two or more BSs.

The MAC channel frame structure also includes a Next MAC ID field. This field is an n-bit wide field, where n represents a number of bits which can accommodate the maximum allowable width of the MAC ID field. The Next MAC ID field indicates which MS(s) 10 are allowed to transmit data during the next time slot, i.e. who will have the next token. The Next MAC ID field is sent in each MAC frame message. As a result, if any MSs 10 miss one or more MAC frames they are enabled to quickly determine the access token rotation.

Lastly, the MAC channel frame structure includes a #Free Channels field. This field is an m-bit wide field, where m represents a number of bits which can accommodate an integer that indicates the maximum number of traffic channels within a BS that are allocated for packet data transmission. The value of the #Free Channels field indicates the number of currently available traffic channels in the BS 30 in a given time slot.

Figure 4:
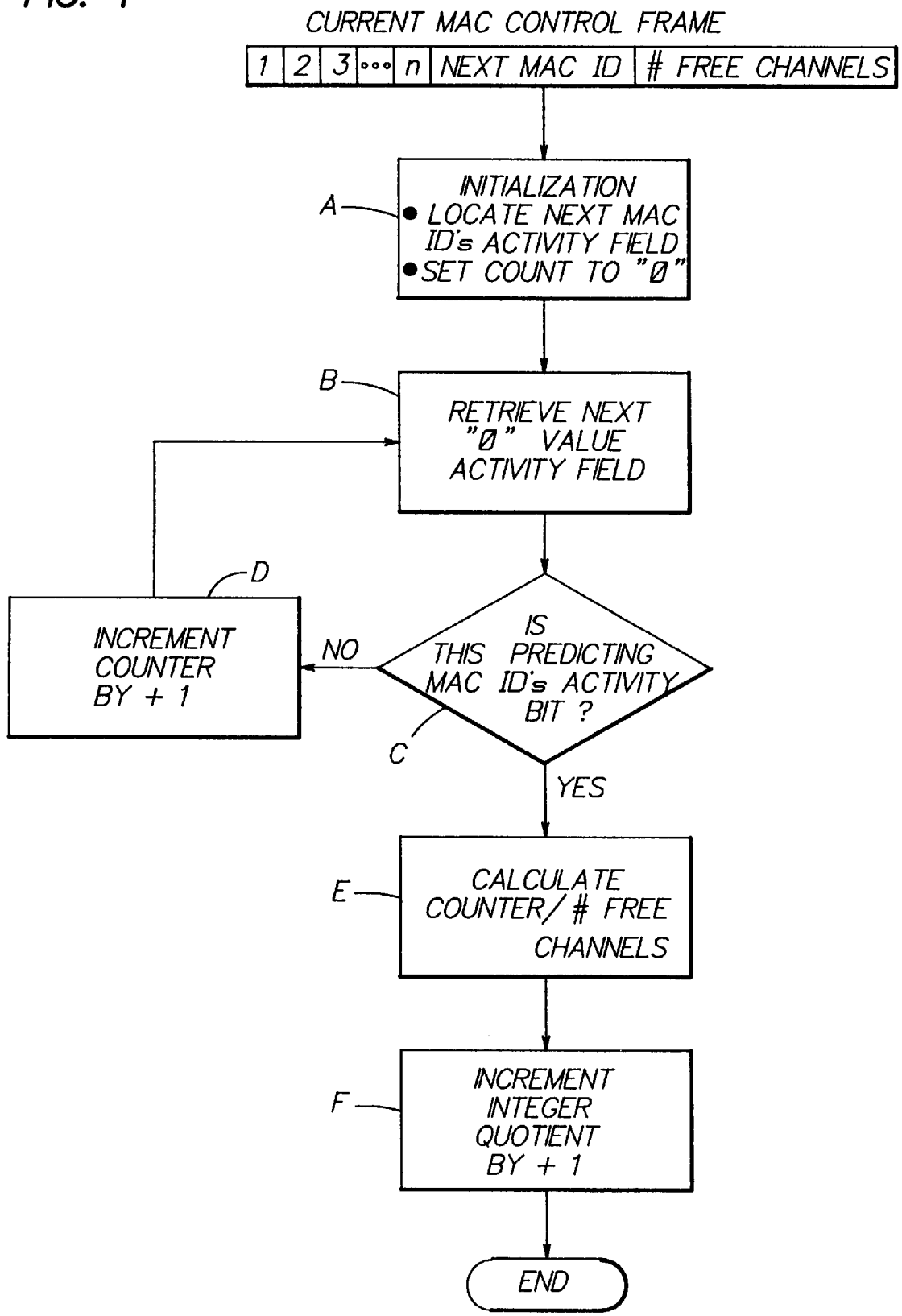
FIG. 4 is a logic flow diagram, according to the invention, for a MS to predict its next allocation of a token.

In accordance with this invention, and referring to FIGS. 3A and 4, a MS 10 evaluates the fields within the MAC channel frame structure and predicts when it will be allocated a token. A MS 10 accomplishes this prediction in the following manner. First, at Block A, an initialization step for a counting process is performed. This initialization step evaluates the MAC channel frame structure and locates, within the MAC channel frame, the activity field that corresponds to the MS 10 whose MAC ID is equal to the value of the Next MAC ID field. Additionally, the initialization step sets to a value of zero a variable which represents the result of the counting process. The counting process is performed at Blocks B through D inclusive. Within the process a predicting MS 10 counts, in a cyclic manner, activity fields within the MAC control frame structure with values of zero. At Block B, the counting process starts at the Next MAC ID's activity field position and, moving from left to right, retrieves the next activity field in the MAC control frame whose value is zero. At Block C, this retrieved activity field is evaluated to determine whether it corresponds to the MAC ID of the predicting MS 10. If this retrieved activity field corresponds to the MAC ID of the predicting MS 10 then the counting process is complete, and the prediction algorithm continues at Block E. However, if the retrieved activity field does not correspond to the predicting MS, then the variable which represents the counting result is incremented by one at Block D. Note, because the accounting process begins after retrieval of the activity field which corresponds to the Next MAC ID, this activity field is excluded from the count. The counting process will cycle through Blocks B, C, and D until the activity field corresponding to the predicting MS 10 is encountered, i.e. the condition evaluated in Block C is "YES".

After the counting process has completed, the prediction procedure continues, at Blocks B and F, by performing a calculation which uses the current value of the #Free Channels field and the counting variable defined above. For purposes of illustration, if the predicting MS 10 assigns the result of the counting process to a variable "x", and assuming the current #Free Channels field is assigned to a variable "M", the calculation at Blocks E and F is represented by the following formula:

$$y=INT(x/M)+1. \tag{1}$$

If the current slot number is j, then the (j+y)th slot is the predicting MS's turn to have the token. Also, this implies that if the predicting MS's position is within M−1 zero bits of the MS corresponding to the Next MAC ID, then a token will be allocated to the predicting MS in the next slot because a traffic channel will be available.

In the minimum form, the prediction of token usage is only valid for the next time slot. That is, the BS 30 may update the token allocation information every time slot. To reduce the MS's 10 receiving activity, the BS 30 may choose to update the token allocation information differently so that the calculation from Equation (1) is valid for the next x time slots, or a time period referred to as a super-frame. Consequently, the MS 10 does not have to decode the MAC message in every time slot in order not to miss its turn for transmission. The super-frame time period is controlled by the BS 30.

Figure 5:
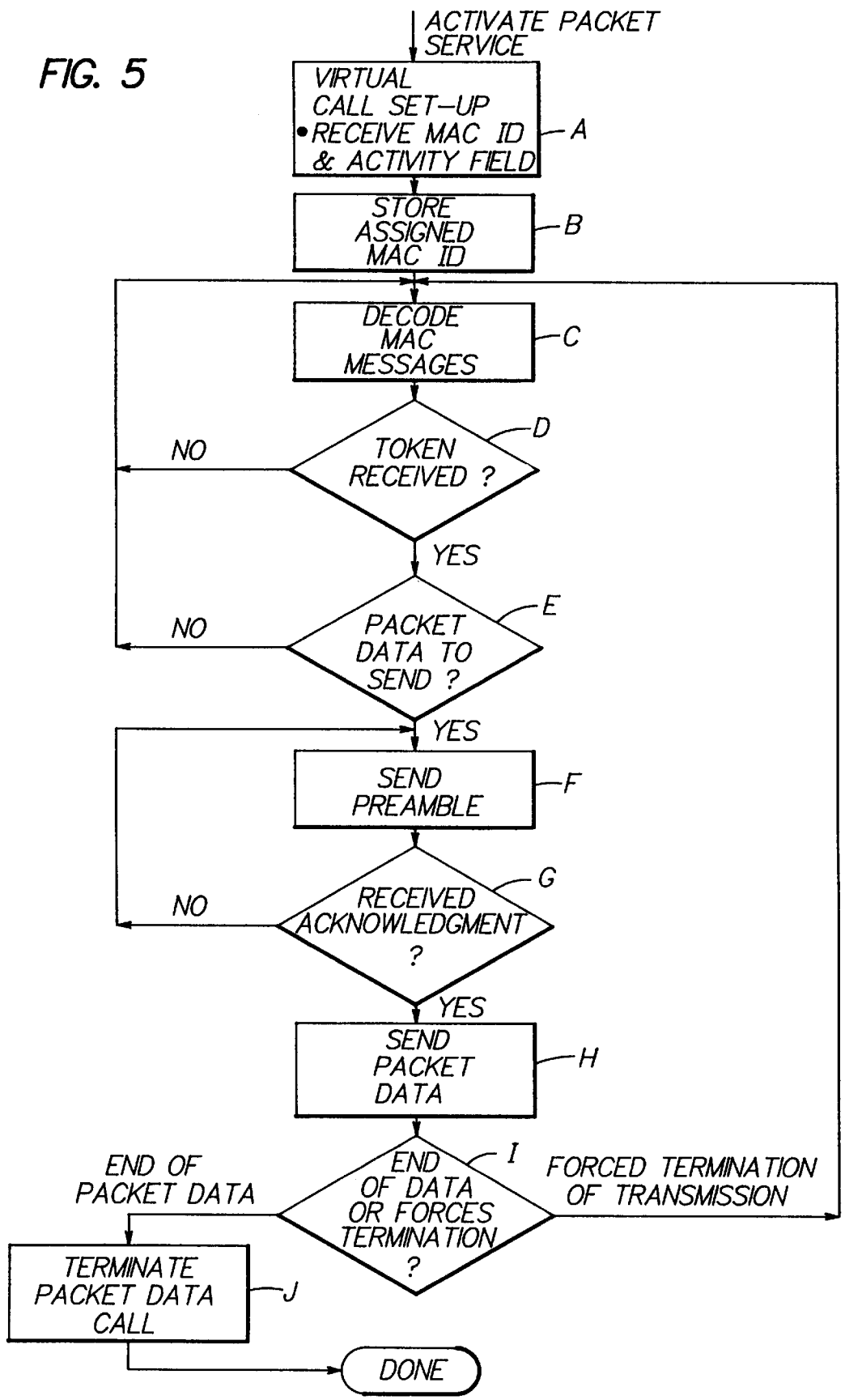
FIG. 5 is a state flow diagram, according to the invention, for MS packet operation.

In accordance with this invention, and referring to FIG. 5, packet MS operation is as follows. Whenever a MS 10 with packet data service mode activated enters the cell, or when a MS 10 in the cell activates packet data mode, the BS 30 assigns a MAC ID number, and thus a corresponding activity field, to the MS 10. This assignment, referred to as virtual call set-up, is shown at Block A. At Block B, the MS 10 stores the temporary MAC ID in the memory 24.

Once the MAC ID and activity field are assigned, the MS 10 decodes the broadcast MAC messages sent from the BS 30. This decoding, shown at Block C and D, continues until the MS 10 determines that it was allocated the token by the BS 30. Allocation of the token enables the MS 10 to transmit its packet data. However, at Block E, the MS 10 must first determine whether it has packet data to send. If the MS 10 does not have packet data to send it continues to decode MAC messages and the BS 30 will allocate the token to the next MS 10 in the subsequent time slot. If the MS 10 does have data to transmit then it begins a transmission process as shown in Blocks F through I. First, at Block F, the MS 10 transmits a preamble message on the reverse link to the BS 30. If the BS 30 receives the preamble it replies with an acknowledgment. If the acknowledgment is received then the MS 10, as shown in Blocks G and H, transmits its packet data. The transmission continues until all MS 10 packet data is sent, or a maximum number of bytes to transmit is surpassed, or a predetermined time-out period is exceeded, shown in Block H and I. If the maximum number of bytes to transfer is encountered or the time-out period is exceeded, transmission may be stopped and the transmitting MS 10 returned to the decoding step, Block C, described above. However, if packet data transmission is successful the packet data call is terminated, the transmission process is complete, and the token is allocated by the BS 30 in the subsequent time slot to the next MS 10 in the cell.

In accordance with the present invention, the BS 30 allows the MS 10 to turn off its receiver and save power during the periods when the MS is not allocated the token. If the MS 10 does shut down its processing between tokens, the BS 30 informs the MS 10, before the MS 10 shuts down, when it should start its processing again, i.e. when the MS 10 will be allocated the token again. This notification by the BS 30 before the MS 10 shuts down is possible as the token is assigned in advance. Thus, a "dynamic slotted mode" operation is provided, the operation being dynamic in that the position of the slot need not be the same in every cycle. The slot position is a function of how many active MSs 10 are on the channel, and on how much data each MS 10 can transmit. Additionally, the number of slots is a function of the number of available channels at the BS 30.

The BS 30 may transmit packets destined for a MS 10, if any, or fill data, on the forward link at the same time that the MS 10 is allocated a token and is transmitting packets on the reverse link. This allows the BS 30 to send power control information to the MS 10.

Figure 6:
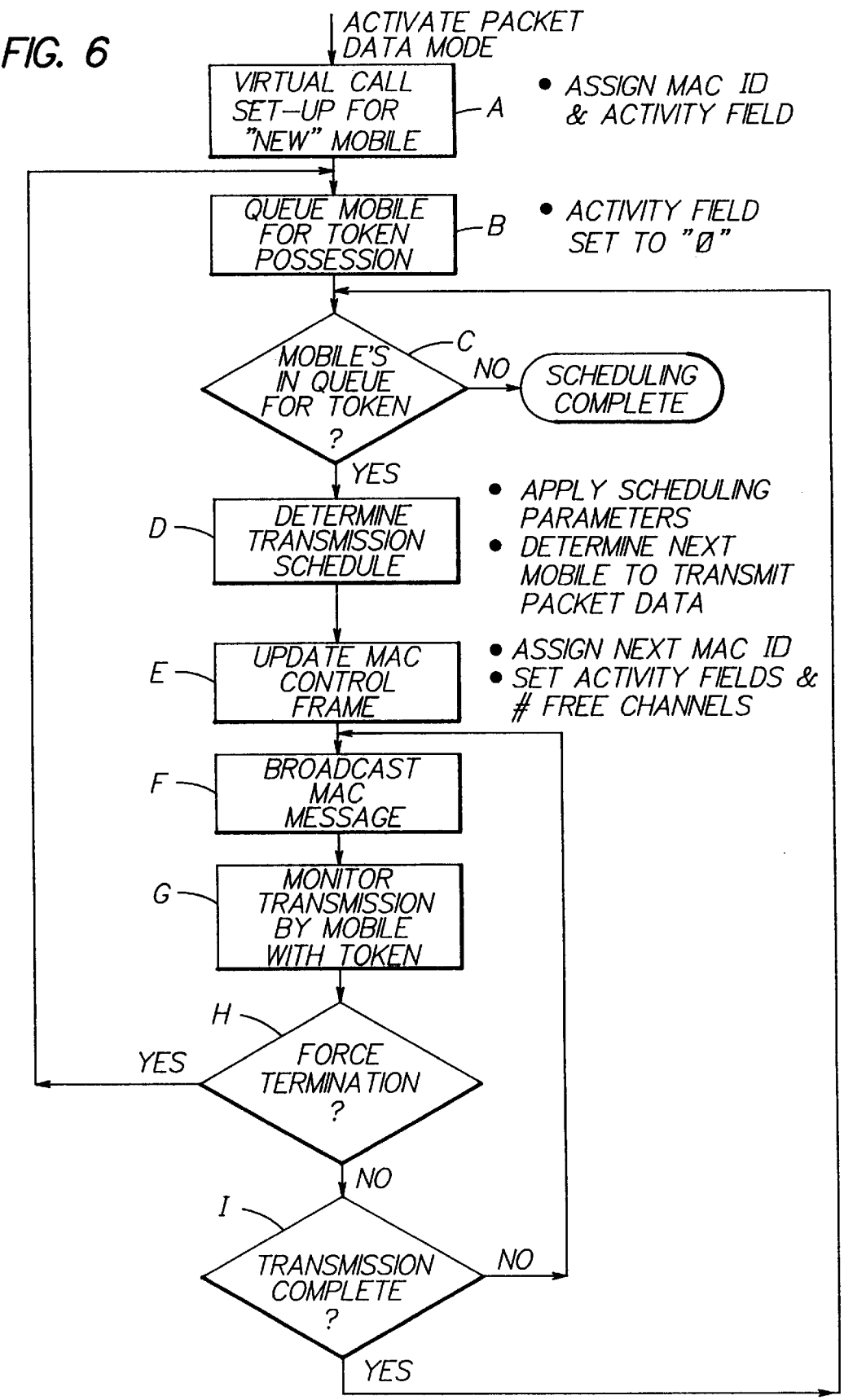
FIG. 6 is a state flow diagram, according to the invention, for BS packet operation.

In accordance with this invention, and referring to FIG. 6, packet BS 30 operation is as follows. Note, FIG. 6 assumes that the BS 30 has divided traffic channel access into the discrete time periods referred to above as time slots. Thus, BS 30 operation, as shown in FIG. 6, begins when a MS 10 activates packet data mode. At Block A, the BS 30 assigns a MAC ID number and activity field to the MS 10 with packet data mode active, this assignment is referred to as virtual call set-up. In virtual call set-up, the BS 30 initially assigns the activity field corresponding to the MS 10 a value of one. On the subsequent MAC frame, shown at Block B, the BS 30 sets this activity field value to zero, which indicates that the MS 10 of the newly assigned MAC ID is in the queue for access to a traffic channel. Whenever a MS 10 with packet data service mode active leaves the cell, or deactivates the packet data mode, the BS 30 release the MAC ID number from the MS 10 and, in the subsequent MAC message, the BS 30 sets the corresponding activity field of the released MAC ID to one, thus dequeuing the MS 10 from traffic channel access.

At Block C, the BS 30 evaluates the queue of MSs 10 awaiting a token. If no MSs are waiting, the scheduling process is complete. However, if one or more MSs remain queued for access, the BS determines a scheduling sequence. At Block D, a scheduling algorithm is employed which considers one or more parameters including, for example, prioritized access, service quality factors, and a maximum number of bytes to transmit by each MS 10. Once a schedule is determined which ensures efficient packet data transmission the BS 10 updates the MAC control structure frame to reflect the schedule.

The BS 30 performs this updating, shown at Block E, as follows. A change in token scheduling status begins when the BS 30 cycles the value assigned to the Next MAC ID field to identify the MAC ID of the MS 10 that is to be allocated the token in the next time slot. Once this MS 10 is allocated the traffic channel and begins transmission of its packet data the BS 30 updates the MS's corresponding activity field to a value of one, decreases the value of the #Free Channels field by a value of one, and reassigns the value of the Next MAC ID field to identify the MS 10 that is to transmit its packet data in the next time slot.

This cyclic assignment can be further demonstrated by considering the MAC control frame structure fields in both an inactive and active state. In the inactive state, when there are no packet data MSs 10 within a cell, all activity fields of the MAC control structure frame are a value of one, the Next MAC ID field has a value of zero, and the #Free Channels field has a value equal to the maximum number of receivers 30a in the BS 30 that are allocated for packet services. In the active state, after the BS 30 has assigned a unique MAC ID to each packet mode MS 10 in a cell, the MAC control frame activity fields corresponding to the assigned MAC IDs without a token are a value of zero, the Next MAC ID field is a value which corresponds to the MAC ID of the MS 10 that is scheduled to be allocated a token in the next time slot, and the #Free Channels field is a value which represents the number of receivers 30a in the BS 30 that support packet service, less the number of channels occupied by MSs 10 that currently are allocated the token or tokens. Note, the BS 30 decreases the value of the #Free Channels field by one whenever a MS 10 successfully acquires a traffic channel and starts to transmit packet data. Likewise, the BS 30 increases the value of the #Free Channels field by one when the traffic channel is released at the end of packet transmission. Thus, the transmission schedule is defined by the values of the MAC control frame structure fields.

At Block F, the BS 30 broadcasts the MAC control frame structure to each MS 10 within the cell. As discussed above, when broadcasting MAC channel messages to all MSs 10 within a cell the BS 30 preferably uses a public long code mask, and when transmitting the MAC channel messages to a specific MS 10 the BS 30 may use a permuted electronic serial number (ESN) of the MS 10 as a long code mask.

The MS 10 decodes the MAC message and evaluates the MAC control frame fields to determine the traffic channel access schedule. To ensure preemptive control of channel access the BS 30 monitors, at Block G, the transmissions of the MS 10 that is allocated the token. For example, at Block H, if the maximum number of bytes per transmission is exceeded the BS 30 may force the termination of the MS 10 transmission and return the MS to the queue for token assignment. If the MS 10 transmission completes, as shown in Block I, the BS 30 reallocates the token in the next time slot. This reallocation process is accomplished by looping back to the above evaluation of MSs awaiting packet data transmission permission, Blocks C through I. If transmission is not complete, the BS 30 may rebroadcast the MAC message and continue to monitor the MS's transmission. This scheduling process continues until there are no packet data MSs queued for transmission, i.e. all MS packet data transmissions are complete.

It should be realized that a plurality of MSs 10 could each be allocated a token, giving the mobiles the right to access respective available traffic channels in the BS 30, in a given time slot. By example, if there are n available traffic channels, upto n mobile stations can be granted the token to transmit during a next time slot.

While the invention has been particularly shown and described with respect to preferred embodiments thereof, it will be understood by those skilled in the art that changes in form and details may be made therein without departing from the scope and spirit of the invention.

What is claimed is:

1. A method for performing a virtual soft handoff update comprising the steps of:

prior to a mobile station receiving a traffic channel, transmitting media access control (MAC) information from each of a plurality of base stations to the mobile station, wherein the MAC information comprises a MAC control frame structure for conveying packet data transmission scheduling information for a selected base station of the plurality of base stations, the MAC control frame structure including a plurality of activity fields, one activity field for each active packet data mobile station within a cell of said selected base station, a Next MAC ID field which specifies the identification of a mobile station to be given traffic channel access in a next time slot, and a # Free Channel field which specifies a number of available traffic channels for packet data service at said selected base station;

receiving the MAC information from the plurality of base stations at the mobile station;

measuring a strength of pilot signals received by the mobile station from each of the plurality of base stations; and executing the virtual soft handoff update by selecting a base station from the plurality of base stations transmitting MAC information to the mobile station according to the measured strength of the pilot signals.

2. A wireless communications telecommunications system comprising:

a transmission unit, in individual ones of a plurality of base stations for transmitting, prior to a mobile station receiving a traffic channel, media access control (MAC) information from each of said plurality of base stations to said mobile station, wherein the MAC information comprises a MAC control frame structure for conveying packet data transmission scheduling information for a selected base station of said plurality of base stations, the MAC control frame structure including a plurality of activity fields, one activity field for each active packet data mobile station within a cell of said selected base station, a Next MAC ID field which specifies the identification of a mobile station to be given traffic channel access in a next time slot and a # Free Channel field which specifies a number of available traffic channels for packet data service at said selected base station; and said mobile station comprises a receiver for receiving the MAC information from said plurality of base stations; a received signal measurement unit for measuring a strength of pilot signals received by said mobile station from each of said plurality of base stations; and a processor, responsive to the measured strength of the received pilot signals, for executing the virtual soft handoff update by selecting a base station from said plurality of base stations that are transmitting MAC information to said mobile station.

* * * * *